Dec. 8, 1953 G. A. JORGENSON 2,661,855
RETRACTABLE CHUTE FOR TROUGH HOISTS
Filed June 6, 1951 4 Sheets-Sheet 1
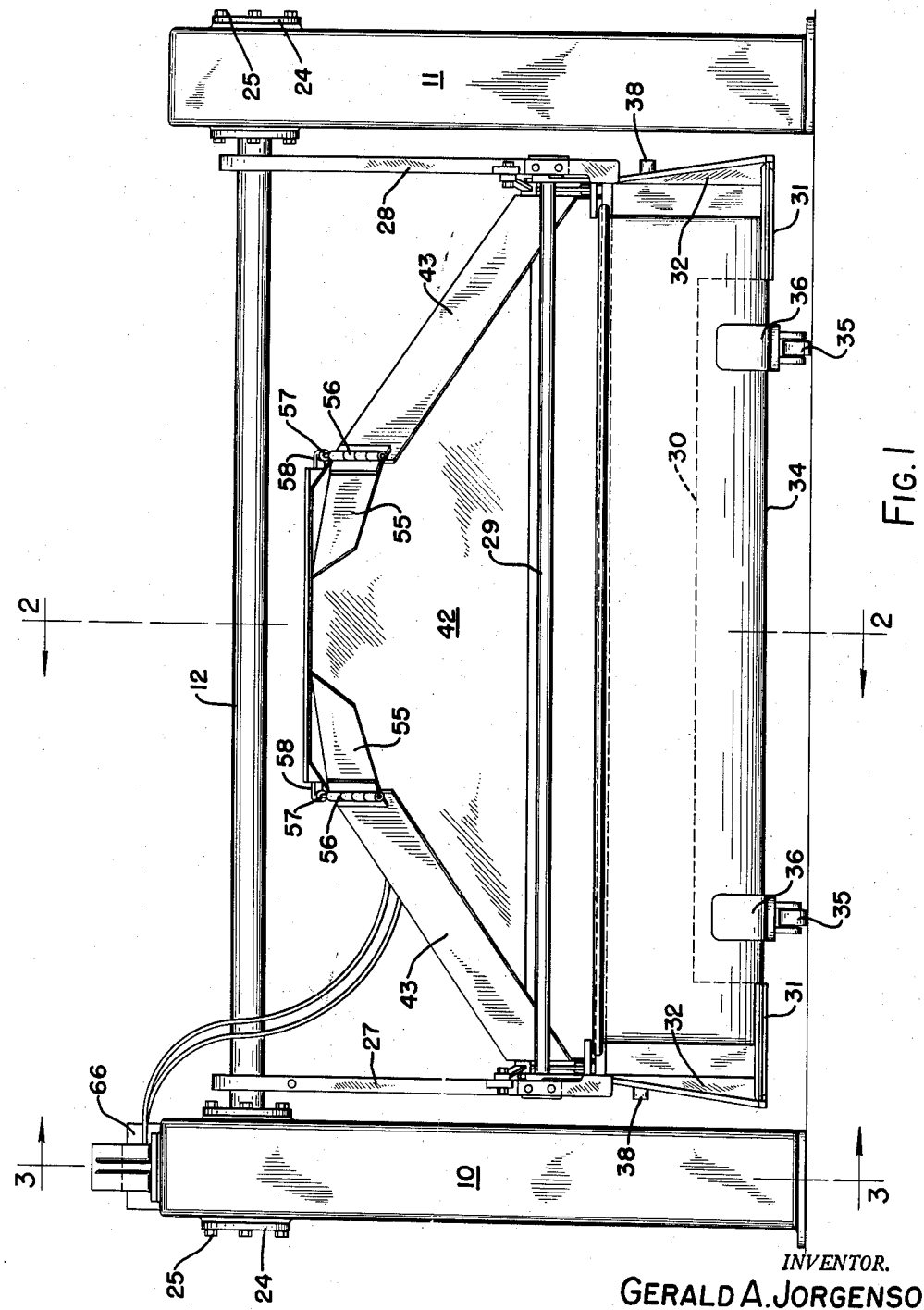
FIG. I
INVENTOR.
GERALD A. JORGENSON
BY
Otto Moeller
Attorney Dec. 8, 1953  G. A. JORGENSON  2,661,855
RETRACTABLE CHUTE FOR TROUGH HOISTS
Filed June 6, 1951  4 Sheets-Sheet 2

INVENTOR.
GERALD A. JORGENSON
BY
Otto Moeller
Attorney

Dec. 8, 1953  G. A. JORGENSON  2,661,855
RETRACTABLE CHUTE FOR TROUGH HOISTS
Filed June 6, 1951  4 Sheets-Sheet 3

INVENTOR.
GERALD A. JORGENSON
BY
Otto Moeller
Attorney

Dec. 8, 1953
G. A. JORGENSON
2,661,855
RETRACTABLE CHUTE FOR TROUGH HOISTS
Filed June 6, 1951
4 Sheets-Sheet 4
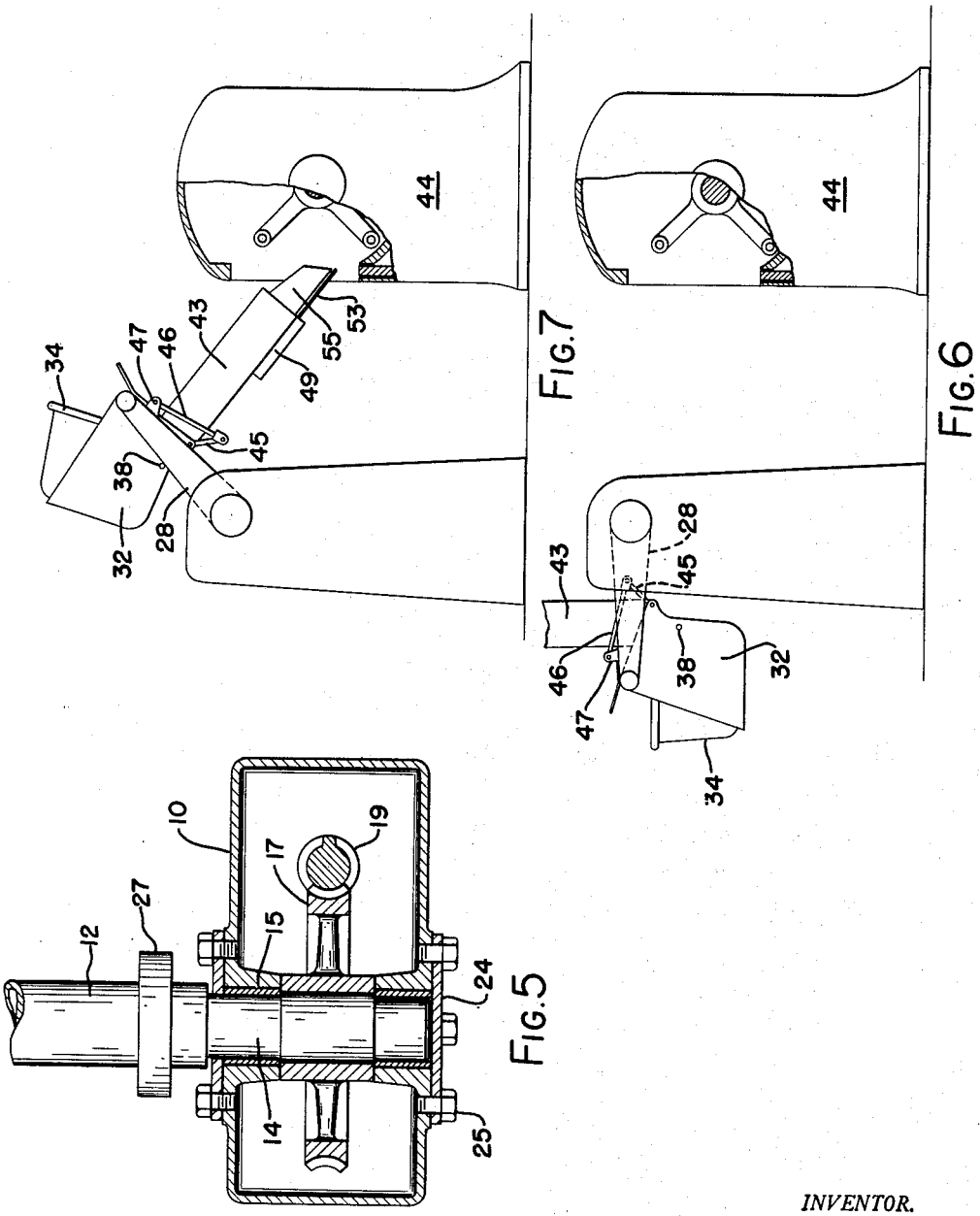
INVENTOR.
GERALD A. JORGENSON
BY
Otto Moeller
Attorney Patented Dec. 8, 1953

2,661,855

UNITED STATES PATENT OFFICE 2,661,855

RETRACTABLE CHUTE FOR TROUGH HOISTS

Gerald A. Jorgenson, York, Pa., assignor to Read Standard Corporation, New York, N. Y., a corporation of Delaware Application June 6, 1951, Serial No. 230,118

7 Claims. (Cl. 214—307)

The present invention relates broadly to dough handling equipment and more specifically to a dough trough hoist having a retractable chute.

In present day commercial bakeries large masses of dough are conveyed from one piece of dough working machinery to another in huge caster mounted troughs. As illustrative of such an operation measured quantities of flour, water, salt and the like are delivered to a mixer wherein said ingredients undergo a mixing operation for a specific period of time. After the mixing operation the dough is discharged from the mixer into a trough which in turn is moved into a proofing room for a period of time, from where the dough is usually returned to a mixer.

In large commercial bakeries a dough trough hoist and a mixer, of a horizontal type, are disposed in spaced relation and are adapted to function as a unit for delivering dough from a trough to the mixer. The dough trough hoists of present day usage are not adapted to deliver dough, effectively and efficiently, to all types of horizontal mixers, due in many instances to changes in design and construction of the mixers.

One of the objects of the present invention is to provide a dough hoist having a chute with an extension thereon for delivering dough to a mixer.

Another object is to provide a dough hoist chute with a movable extension thereon which is adapted to be advanced or retracted commensurate with the movement of the dough hoist.

Another object is to provide a dough hoist chute having gates pivotally mounted on the sides thereof and adapted to be moved to an open position to define an extension of the sides of the chute for guiding a mass of dough being discharged from the chute.

A further object is to provide a dough hoist chute having an extension thereon with an actuating mechanism connected thereto for advancing the extension beyond the discharge end of the chute to facilitate the delivery of a mass of dough to a mixer.

Still further objects of the present invention are to provide a dough hoist chute with an extension thereon which is economical of manufacture, positive in operation and readily adaptable to dough hoist chutes in present day usage.

Other objects and advantages more or less ancillary to the foregoing and the manner in which all of the various objects are realized will appear in the following description, which considered in connection with the accompanying drawings, sets forth the preferred embodiment of the invention.

Referring to the drawings wherein the preferred embodiment of the invention is illustrated;

Figure 1 is a front elevational view of a dough hoist with a trough supported therein;

Figure 5 is a detail sectional view showing the mounting for one end of the main dough hoist supporting shaft, the view being taken on line 5—5 of Figure 3;

Figure 6 is a diagrammatic representation of a dough trough hoist after the hoist has moved through an arc of travel of approximately 90 degrees; and Figure 7 is a diagrammatic representation showing the position of the various parts of a dough trough hoist as the contents of the trough are being discharged through a chute into a mixer.

Figure 3:
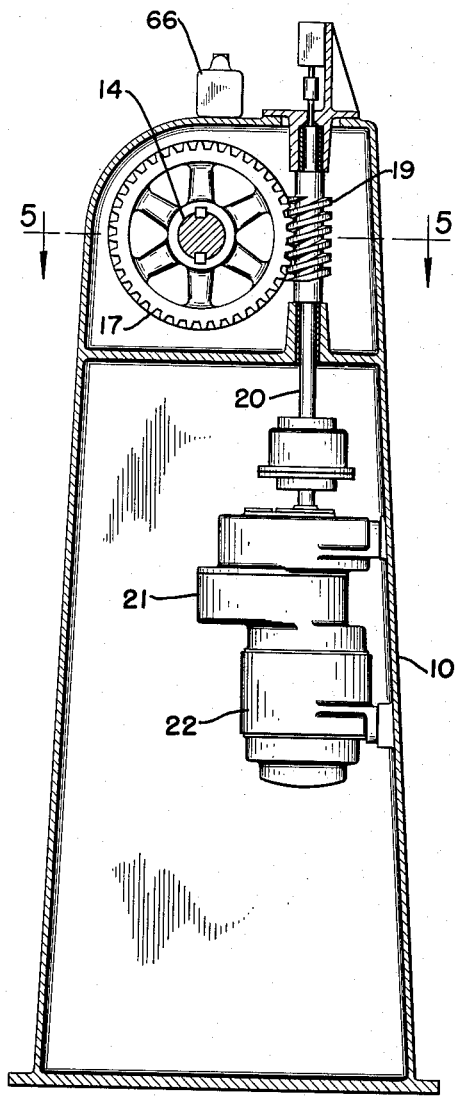
Figure 3 is a vertical sectional view of one end of a dough hoist showing the drive mechanism, the view being taken on line 3—3 of Figure 1.

Referring to the drawings, there is shown in Figure 1 a dough hoist comprising columns 10 and 11, which are disposed in spaced parallel relation. A shaft 12, formed with reduced end portions 14, one of which is shown in Figure 5, are rotatably mounted in suitable bearing supports 15 provided in the top end portions of the columns 10 and 11. The end of the shaft 12, which is disposed within the column 10, has keyed thereto a gear 17 which meshes with a worm gear 19 mounted on a shaft 20, Figure 3. The shaft 20 is connected to a gear reduction unit 21, which in turn is driven by a suitable electric motor 22 within the column 10. The reduced end portions 14 of the shaft 12 are retained in the bearing supports 15 by plates 24 which are secured to the columns 10 and 11 by bolts 25.

Figure 2:
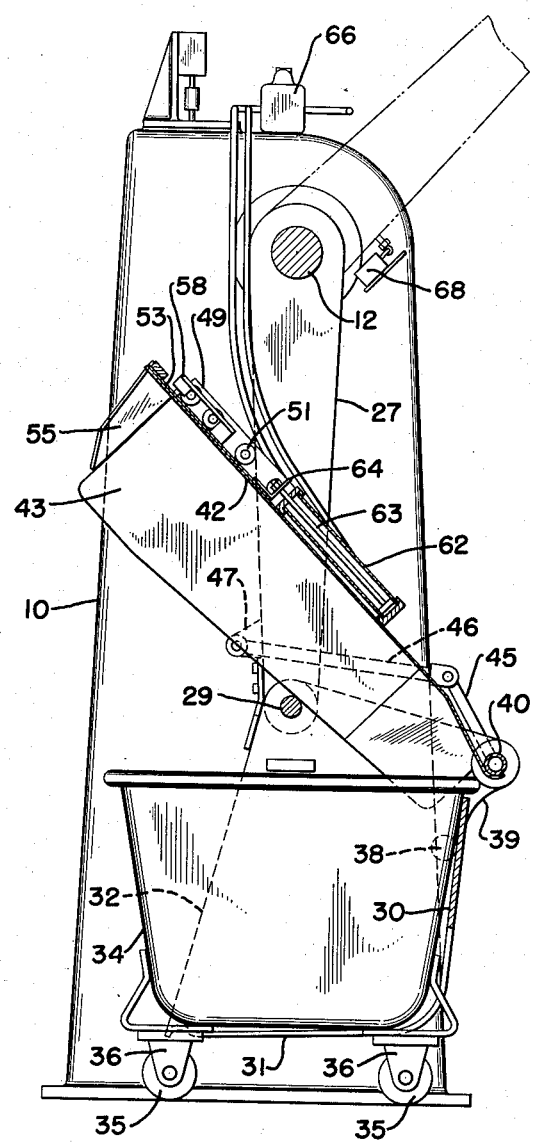
Figure 2 is a vertical sectional view of a dough hoist with a trough supported therein and shown in elevation, the view being taken on line 2—2 of Figure 1.

As shown in Figures 1 and 2, the shaft 12 has secured thereon adjacent the columns 10 and 11, depending crank arms 27 and 28 which are connected at their lower ends by an auxiliary cradle supporting shaft 29. The shaft 29 has suspended therefrom a cradle consisting of a back member 30 which terminates in spaced bottom supporting pieces or ledges 31, which ledges are connected to side members 32 that are journalled on the auxiliary supporting shaft 29. Thus the cradle takes the form of a pair of side stirrups depending from the shaft 29 and which are joined together by the back member 30. The bottom supporting ledges 31 are adapted to engage and receive a trough 34 which has casters 35 secured to the bottom thereof by suitable brackets 36.

The side members 32 of the cradle structure are provided on their outer faces thereof with pins or stub members 38 which are adapted to engage the crank arms 27 and 28 as the cradle and trough 34 move about the shaft 12, from the position shown in Figure 6 to the position shown in Figure 7, and, thus effect a tilting of the cradle and the trough. The side pieces 32 are adapted to extend rearwardly and over the back member 30 to define brackets 39 in which is journalled a shaft 40. The shaft 40 has mounted thereon a dough chute which includes a generally flat triangular shaped bottom portion 42 that is provided with vertically extending side members 43 that converge towards the free or discharge end of the chute.

The dough chute is automatically moved from the inverted position shown in Figures 1 and 2 to the discharge position shown in Figure 7 for receiving and guiding a mass of dough from the trough 34 into a mixer 44. The actuation or rotation of the dough chute about the shaft 40 is accomplished by suitable linkage interposed between the shaft 40 and the crank arms 27 and 28. The shaft 40 has secured thereto adjacent its respective ends, levers 45 which are pivotally connected to links 46 that are in turn connected to brackets 47 which are mounted on the crank arms 27 and 28.

The bottom portion 42 of the dough chute has secured to its outer surface, adjacent its discharge end, a pair of spaced depending brackets 49. A plurality of stub shafts having enlarged ends 50 are mounted in the brackets 49 in spaced relation. The inner ends of the stub shafts have rollers 51 mounted thereon and retained in spaced relation with the brackets 49 by spacer sleeves 52. Interposed between the rollers 51 and the outer surface of the bottom portion 42 of the dough chute there is a plate member 53 which is adapted to move over the rollers and project outwardly beyond the discharge end of the dough chute.

Figure 4:
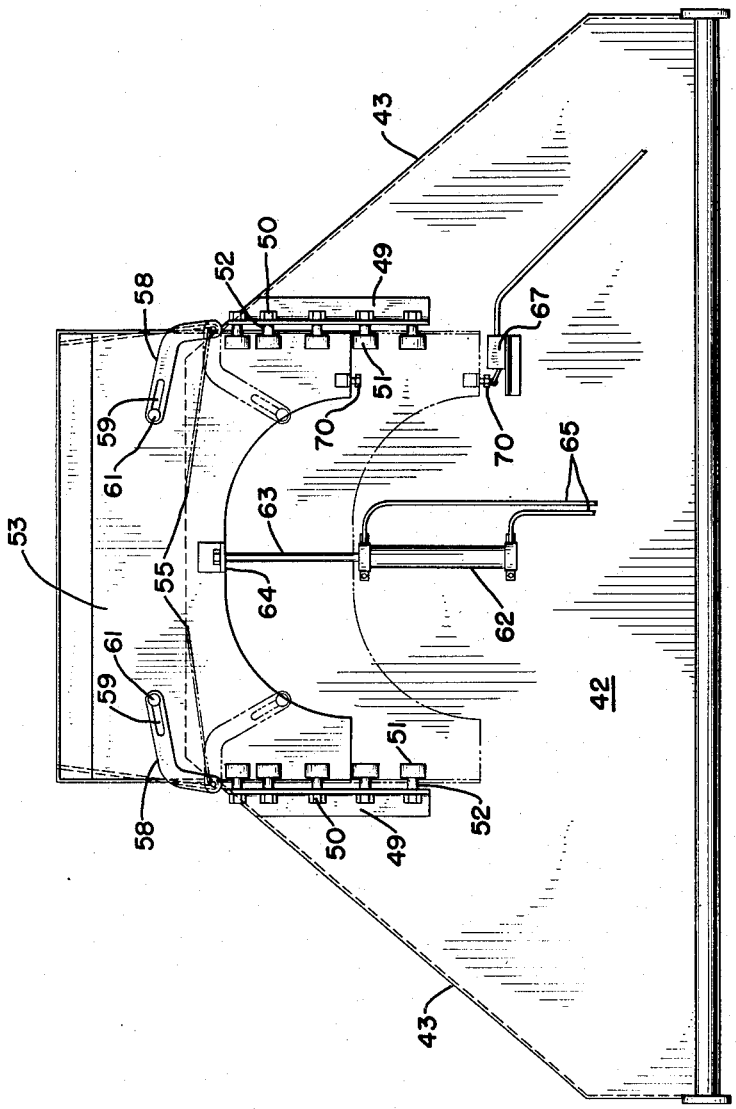
Figure 4 is a bottom plan view of a dough hoist chute showing the extension mounted thereon, the extension being shown in an advanced or projected position in full lines and in a retracted position in dotted lines.

The ends of the side members 43 which terminate adjacent the discharge end of the dough chute have gates 55 pivotally mounted thereon by hinges 56. The gates 55 in their closed position extend across and tend to close the discharge end of the dough chute. The hinge pins 57 of the hinges 56 extend below the bottom portion 42 of the dough chute and have secured thereto levers 58. The free ends of the levers 58 are provided with slotted portions 59 through which project studs 61 mounted on the bottom face of the plate member 53. Thus when the plate member 53 is advanced beyond the discharge end of the dough chute, as shown in full lines in Figure 4, the levers 58 cause the gates to be opened outwardly where they extend along the sides of the plate member 53, as shown in dotted lines in Figure 4, and thus constitute sides for the plate member 53.

A cylinder 62 is secured to the outer surface of the bottom portion 42 of the dough chute and is provided with a piston 63 which is connected to a bracket 64 provided on the rear edge of the plate member 53. The cylinder 62 has connected to its ends suitable flexible conduits 65 which terminate in an air valve 66 mounted on the top of column 10. The air valve 66 is in turn connected to a source of compressed air for actuating the piston 63 and in turn advancing or retracting the plate member 53 with respect to the discharge end of the dough chute. An electric switch 67, of any suitable type, is mounted on the dough chute adjacent the cylinder 62 and is adapted to be engaged by the rear end of the plate member 53 when in its retracted position, Figure 4. The switch 67 is in turn connected to the motor 22 so that when the plate member 53 engages the switch 67 the motor will be energized for rotating the shaft 12.

The column 10 has mounted thereon an electric contact switch 68, of any suitable type which is adapted to be engaged by the crank arm 27, as shown in dotted line position in Figure 2, upon the rotation of the shaft 12. The switch 68 is connected to the air valve 66 for controlling the actuation of the air valve and the consequent movement of the piston 63 within the cylinder 62.

In the operation of the dough hoist of the present invention a suitable control panel of a conventional type, not shown, is mounted on the column 10. The control panel consists of push buttons designated up, down and stop, while the motor 22 is provided with suitable limit switches. The up and stop push buttons are connected to the motor 22, while the down button is connected to the air valve 66. With a batch of dough in the trough 34 and said trough positioned in the cradle structure, as shown in Figures 1 and 2, the up button on the control panel is pushed which starts the motor 22 and causes shaft 12 to be rotated. The rotation of shaft 12 will cause crank arms 27 and 28 and the cradle structure to move through an arcuate path in a clockwise direction in Figures 2, 6 and 7.

The crank arms 27 and 28 travel through an arc of approximately 120° and during the greater portion of their travel the cradle structure with the trough therein remains in an upright position due to the force of gravity and the mounting of the cradle on shaft 29. Before the crank arms 27 and 28 reach the limit of their arc of travel the pins 38 on the sides 32 of the cradle structure engage the crank arms so that the arms and cradle structure then move as a unit and the cradle gradually assumes the tilting position, as shown in Figure 7. With the cradle in the position shown in Figure 7, the dough in the trough 34 will be discharged into the dough chute when the crank arms have completed their arc of movement. As the crank arms 27 and 28 reach the position shown in Figure 7 a suitable limit switch will stop the motor 22.

As the crank arms approach the limit of their arcuate travel the arm 27 engages switch 68 which causes air valve 66 to be actuated permitting air under pressure to be delivered through a conduit 65 to the rear end of cylinder 62. The admission of air to the rear end of cylinder 62 forces piston 63 outwardly and consequently advances the plate member 53 over the rollers 51 and beyond the discharge end of the dough chute. Upon the movement of the plate member 53 the gates 55 are moved outwardly to their open position, as shown in Figure 7.

After the mass of dough has been discharged from the trough 34 into the dough chute and then into the mixer 44 the return movement of the dough hoist to its starting or original position will be initiated by pushing the down button on the control panel on column 10. Upon pushing the down button the air valve 66 will be actuated to cut off the air pressure to the rear end of cylinder 62 and to deliver air under pressure to the front end of cylinder 62 for retracting the piston 63. The actuation of piston 63 causes the plate member 53 to be retracted and the gates 55 to be swung to their closed position. As the plate member 53 is moved to its retracted position a pin 70 on the plate member 53 engages and closes switch 67. The closing of switch 67 energizes the motor 22, through suitable means not shown, to cause the motor 22 to be run in a reverse direction for lowering the dough hoist to its initial position. A suitable limit switch is connected to the motor 22 to stop the motor when the parts have reached their initial or starting position. The stop button is for stopping the dough hoist in any desired position.

I claim:

1. In a dough trough hoist, a rotatable shaft, crank arms secured to said shaft for swingably supporting a cradle having a dough trough therein, a chute associated with said cradle, driving means connected to said shaft for moving said cradle and chute through an arcuate path to discharge the dough from said trough into said chute, a plate slidably mounted on said chute and actuating means on said chute engageable with said plate for advancing and retracting said plate beyond the discharge end of said chute, and control means associated with said actuating means responsive to elevation of said cradle and chute to a predetermined point in said arcuate path for initiating operation of said actuating means to effect advancement of said plate beyond the discharge end of said chute.

2. In a hoist, a rotatable shaft, crank arms secured to said shaft for swingably supporting a cradle, a chute carried by said cradle, a pair of gates pivotally mounted at the discharge end of said chute, a plate slidably mounted on said chute, means operatively connecting said gates with said plate for actuating said gates contemporaneous with and in response to the movement of said plate, driving means connected to said shaft for moving said cradle and chute through an arcuate path and means on said chute for actuating said plate.

3. In a dough trough hoist, a rotatable shaft, crank arms secured to said shaft for swingably supporting a cradle having a dough trough therein, a chute associated with said cradle, driving means connected to said shaft for moving said cradle and chute through an arcuate path to discharge the dough from said trough into said chute, a pair of gates pivotally mounted on said chute at the discharge end thereof, a plate slidably mounted on said chute subjacent said gates, means connecting said gates with said plate for actuating said gates contemporaneous with the movement of said plate, means on said chute engageable with said plate for moving said plate with respect to said chute and a means associated with the last named means and engageable by one of said arms to effect a movement of said plate.

4. In a dough trough hoist, a rotatable shaft, crank arms secured to said shaft for swingably supporting a cradle having a dough trough therein, a chute associated with said cradle, driving means connected to said shaft for moving said cradle and chute through an arcuate path to discharge the dough from said trough into said chute, a pair of gates pivotally mounted on said chute at the discharge end thereof, a plate slidably mounted on said chute subjacent said gates links connecting said gates with said plate for actuating said gates simultaneous with the movement of said plate, a cylinder on said chute, a piston in said cylinder engageable with said plate for advancing and retracting said plate beyond the discharge end of said chute, an air valve connected to said cylinder, a switch connected to said air valve, said switch engageable by one of said crank arms to effect the movement of said piston in at least one direction.

5. In a hoist, a rotatable shaft, crank arms secured to said shaft for swingably supporting a cradle, a chute associated with said cradle, driving means connected to said shaft for moving said cradle and chute through an arcuate path, a plate slidably mounted on said chute, a cylinder on said chute, a piston in said cylinder engageable with said plate for advancing and retracting said plate beyond the discharge end of said chute, a pair of gates pivotally mounted on said chute at the discharge end thereof, links connecting said gates with said plate to open said gates upon the advancement of said plate, said gates in their open position being disposed above said plate and defining side guide members for said plate, an air valve connected to said cylinder for advancing and retracting said piston within said cylinder, a switch connected to said air valve, said switch engageable by one of said crank arms for actuating said air valve to advance said piston, means for actuating said air valve for retracting said piston and means on said chute engageable by said plate in its retracted position for energizing said driving means to return said cradle and chute to their initial position.

6. In a hoist, a rotatable shaft, crank arms secured to said shaft for swingably supporting a cradle, a chute associated with said cradle, driving means connected to said shaft for moving said cradle and chute through an arcuate path, a pair of depending brackets secured to the bottom of said trough in spaced relation, a plurality of rollers supported in said brackets, a plate interposed between said chute and rollers and adapted to have a sliding movement over said rollers, a cylinder on said chute, a piston in said cylinder engageable with said plate for advancing and retracting said plate beyond the discharge end of said chute, a pair of gates pivotally mounted on said chute at the discharge end thereof, links connected to said gates, said links having slots provided in the free ends thereof, pins provided on said plate and arranged to project through the slots in said links for opening and closing said gates simultaneously with the advancement and retraction of said plate, an air valve connected to said cylinder for advancing and retracting said piston within said cylinder, a switch connected to said air valve, said switch engageable by one of said crank arms for actuating said air valve to advance said piston, means for actuating said air valve for retracting said piston and means on said chute engageable by said plate in its retracted position for energizing said driving means to return said cradle and chute to their initial position.

7. In a dough trough hoist having a rotatable shaft, crank arms secured to said shaft for swingably supporting a cradle having a dough trough therein, a chute associated with said cradle, and having driving means connected to said shaft for moving said cradle and chute through an arcuate path to discharge the dough from the trough into the chute, the improvement comprising a pair of gates pivotally mounted on said chute at the discharge end thereof, a plate slidably mounted on said chute subjacent said gates, means connecting said gates with said plate for actuating said gates contemporaneous with the movement of said plate, actuating means on said chute engageable with said plate for moving said plate with respect to said chute, and control means associated with said actuating means responsive to elevation of said cradle and chute to a predetermined point in their arcuate path for initiating operation of said actuating means to effect advancement of said plate beyond the discharge end of said chute.

GERALD A. JORGENSON.

References Cited in the file of this patent

UNITED STATES PATENTS

| Number | Name | Date |
| --- | --- | --- |
| 1,466,477 | Moetteli | Aug. 28, 1923 |
| 2,204,019 | Koppers | June 11, 1940 |
| 2,219,226 | Gerber | Oct. 22, 1940 |
| 2,576,831 | Folkenroth et al. | Nov. 27, 1951 |

FOREIGN PATENTS

| Number | Country | Date |
| --- | --- | --- |
| 44,047 | Germany | Aug. 9, 1888 |